(No Model.)

I. H. CONGDON.
OIL CUP.

No. 296,390. Patented Apr. 8, 1884.

Witnesses:
L. C. Hills
W. B. Masson

Inventor
Isaac H. Congdon
by E. E. Masson
atty.

UNITED STATES PATENT OFFICE.

ISAAC H. CONGDON, OF OMAHA, NEBRASKA.

OIL-CUP.

SPECIFICATION forming part of Letters Patent No. 296,390, dated April 8, 1884.

Application filed February 1, 1884. (No model.)

*To all whom it may concern:*

Be it known that I, ISAAC H. CONGDON, a citizen of the United States, residing at Omaha, in the county of Douglas and State of Nebraska, have invented certain new and useful Improvements in Oil-Cups, of which the following is a specification, reference being had therein to the accompanying drawings, in which—

Figure 1:
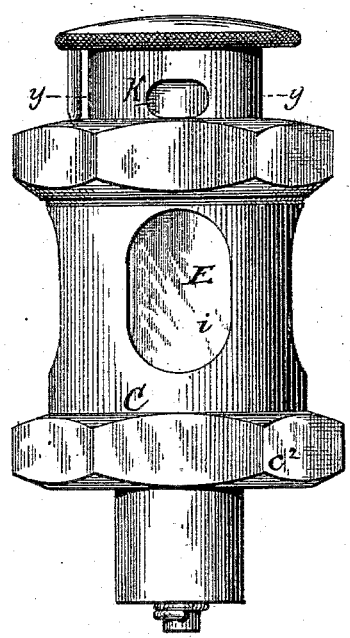
Figure 2:
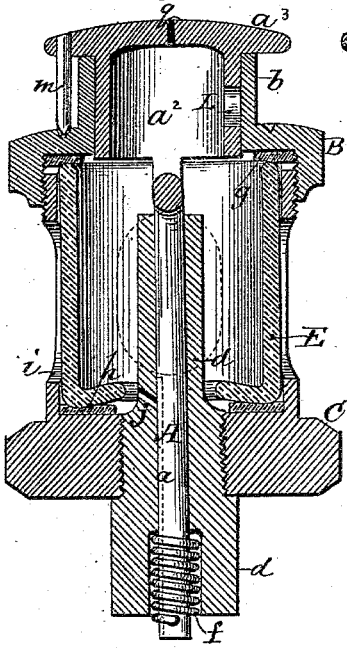
Figure 4:
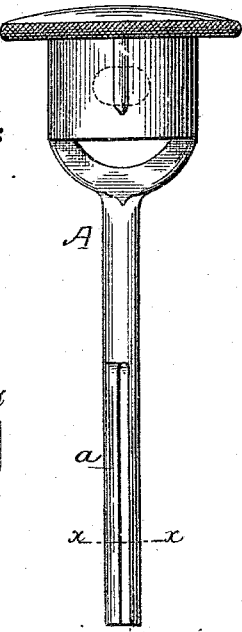
Figure 3:
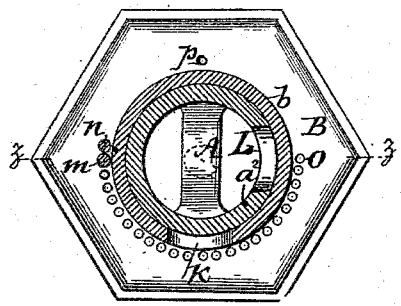
Figure 6:
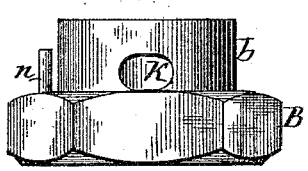
Figure 5:
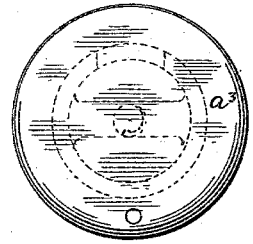
Figure 7:
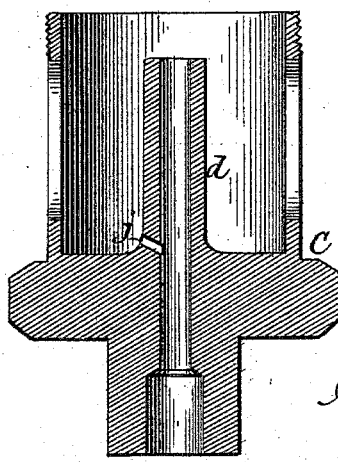
Figure 8:

Figure 1 is an elevation of the oil-cup. Fig. 2 is a vertical section of the same on line $z\ z$ of Fig. 3. Fig. 3 is a cross-section on the line $y\ y$ of Fig. 1. Fig. 4 is an elevation of the feed-stem detached from cup. Fig. 5 is a top view of Fig. 4. Fig. 6 is an elevation of the cap-nut detached from cup. Fig. 7 is a vertical section of the outer shell, with its hollow center stem shown in one piece. Fig. 8 represents on an enlarged scale a cross-section of the feed-stem on the line $x\ x$ of Fig. 4.

The object of my improvement is to furnish an oil-cup of simple construction, through which the flow of oil can be regulated from the finest to the coarsest, and also automatic and uniform after being set, and in which the cup can be refilled without detaching its cylindrical top.

The invention will first be described in connection with the drawings, and then be pointed out in the claims.

In the drawings, A represents the feed-stem, having its lower half cam-shaped in cross-section, and grooved longitudinally at $a$ for the gradual passage of oil, and its upper end in the form of a hollow cylinder, $a^2$, with a projecting cap, $a^3$, resting upon the cylindrical upper end, $b$, of the cap-nut B, closing the top of the outer shell, C. Within the bottom of the latter projects the hollow stem $d$, to guide the feed-stem A, and around the stem $d$ is placed the glass shell E, and the latter is retained in position by means of a cork packing, $g$, placed upon its top edge, and a cork packing, $h$, under the bottom thereof. In the walls of the shell C large holes $i$ are formed, to allow the contents of the glass shell E to be perceived therethrough, and the base of the metal shell C is in the form of a hexagonal nut, $c^2$. The hollow center or guide stem, $d$, is screwed into the outer shell, C, from the under side, and then leaded in or soldered, to prevent leakage. Said stem has a hole through the center, which is enlarged at the lower end for the reception of the spring $f$. A small hole, $j$, Fig. 2, is drilled nearly horizontally into this central stem for the passage of oil to the groove $a$. In uniting the parts, the cork packing $h$ is first dropped into the outer shell, C. The glass shell E is then put in, and is followed by the cork packing $g$. The cap-nut B is then screwed in place. This cap-nut B is a hexagon nut, having a cylindrical rim, $b$, projecting from the top of same, through which is cut an oblong hole, K, Figs. 1 and 3, to receive the nozzle of an oil-can. An oblong hole, L, is cut through the hollow cylindrical part $a^2$ of the feed-stem A, similar to the hole K in the upper part of cap-nut B. When in place, the hollow cylinder $a^2$ of the feed-stem fits into the cylindrical upper end of cap-nut B, and the projecting stem A extends into and through guide-stem $d$. The spiral spring $f$ is slipped over the same, and passes up into the enlarged hole in the lower end of the guide-stem $d$. The end of the spring is passed through a hole drilled through the lower end of the feed-stem A, and thus the projecting cap $a^3$ of feed-stem A is held close down on rim $b$ of cap-nut B. A pin $m$, pendent from the cap $a^3$, has its lower end pointed, and enters into pin-holes in the upper surface of cap-nut B. This point may be quite blunt, and the pin-holes deep enough, so that the pin will not bottom in same. A stop-pin, $n$, Figs. 3 and 6, projects upwardly from the cap-nut B, in the circular path of the pin $m$, to arrest the latter at the end of its course. When the flow of oil is closed, the pin $m$ is then against stop-pin $n$, Fig. 3, and the groove $a$ in feed-stem A is then away from the hole $j$ in the guide-stem $d$. When the feed-stem A (having its lower half cam-shaped) is carried around so that the pin $m$ is at O, Fig. 3, the groove $a$ in feed-stem A is then opposite the hole $j$ in guide-stem $d$, and the feed is then full open. The flow is graduated to any required amount between the stop-pin $n$ and the pin-hole O, by reason of the cam-shape groove in stem of feed-stem A. If feed-stem A is carried around so that the pin $m$ is in pin-hole $p$, Fig. 3, the oblong hole K in the cylindrical portion of cap-nut B and the oblong hole L in the hollow cylinder $a^2$ of feed-stem A will be opposite one another, and through these openings the cup can be filled with oil without removing any of its parts. The small hole $q$ through cap of feed-stem A may be necessary when the cup stands stationary to allow the pressure of atmosphere to force the oil; but when the cup is used on connecting-rods of engines, this hole is not put in, the motion of the connecting-rod being sufficient to cause oil to flow.

Having now fully described my invention, what I claim as new, and desire to secure by Letters Patent, is—

1. The combination of the cam-shaped feed-stem A and guide-stem $d$ with spiral spring $f$, adapted to hold the cap of guide-stem A close on top of the cylindrical cap-nut B, substantially as and for the purpose set forth.

2. The combination of the cam-shaped feed-stem A, having the cylindrical top $a$ and oblong hole L, cut through said cylindrical portion, with the cap-nut B, having the oblong hole K, cut through the extended rim of the same, substantially as and for the purpose described.

In testimony whereof I affix my signature in presence of two witnesses.

ISAAC H. CONGDON.

Witnesses:
JOHN CARRIER,
ISAAC E. CONGDON.